United States Patent [19]
Descalzi et al.

[11] Patent Number: 6,148,242
[45] Date of Patent: Nov. 14, 2000

[54] APPARATUS FOR RECORDING AND UTILIZING BASKETBALL GAME DATA

[75] Inventors: Douglas H. Descalzi, Philadelphia, Pa.; Jeffrey B. Thomas, Richmond, Va.

[73] Assignee: Score Technologies, Inc., Richmond, Va.

[21] Appl. No.: 09/259,456

[22] Filed: Mar. 1, 1999

[51] Int. Cl.[7] .................................................. G06F 17/00
[52] U.S. Cl. .................................. 700/90; 700/91; 700/92; 700/94; 273/148 B; 273/317.3; 273/460; 463/46; 463/47
[58] Field of Search .................................. 700/90, 91, 92, 700/94; 273/317.3, 148 B, 460, 461; 463/46, 47

[56] References Cited

U.S. PATENT DOCUMENTS

| | | | |
|---|---|---|---|
| 4,128,893 | 12/1978 | Johnson et al. | 364/900 |
| 4,130,871 | 12/1978 | Olsen et al. | 364/411 X |
| 4,220,992 | 9/1980 | Blood et al. | 364/410 X |
| 4,864,592 | 9/1989 | Lee | 377/5 X |
| 4,868,772 | 9/1989 | Collard | 364/709.01 X |
| 4,879,651 | 11/1989 | Little, Jr. | 364/411 |
| 4,890,229 | 12/1989 | Rudnick | 364/410 X |
| 4,910,677 | 3/1990 | Remedio et al. | 364/410 X |
| 4,974,161 | 11/1990 | Cullen | 364/411 X |
| 5,127,044 | 6/1992 | Bonito et al. | 379/88 X |
| 5,153,826 | 10/1992 | Johnson | 364/410 |
| 5,377,982 | 1/1995 | Villarreal, Jr. | 273/148 R |
| 5,412,188 | 5/1995 | Metz | 235/375 |
| 5,527,033 | 6/1996 | Puma et al. | 273/148 |
| 5,536,010 | 7/1996 | Lambourne | 364/411 X |
| 5,636,920 | 6/1997 | Shur et al. | 364/410 X |
| 5,653,634 | 8/1997 | Hodges | 463/1 X |
| 5,664,880 | 9/1997 | Johnson et al. | 364/410 X |
| 5,898,587 | 4/1999 | Bell et al. | 364/411.1 X |
| 5,944,633 | 8/1999 | Wittrock | 482/4 X |
| 6,041,266 | 3/2000 | Nickerson | 700/92 X |

*Primary Examiner*—Valencia Martin-Wallace
*Assistant Examiner*—Binh-An Nguyen
*Attorney, Agent, or Firm*—Norman B. Rainer

[57] ABSTRACT

A portable electronic hand-held device for recording and computing basketball data during the game includes an impact-resistant housing having a top surface equipped with an LCD (liquid crystal display) of rectangular contour, and a series of control touch keys. The keys are arranged in groups which relate to player or teams, game events, and operational features of the device. A microcontroller, interactive with separate non-volatile data storage systems provides the ability to record and manipulate game, team and season information.

15 Claims, 8 Drawing Sheets

Figure 4: Game Stats Screen

| NO | NAME | PT | RB | OR | DR | AS | TO | BL | ST | PF | MP |
|---|---|---|---|---|---|---|---|---|---|---|---|
| 23 | JORDAN | 28 | 4 | 1 | 3 | 4 | 4 | 0 | 3 | 4 | 45 |
| 33 | PIPPEN | 6 | 11 | 6 | 5 | 11 | 4 | 1 | 3 | 6 | 45 |
| 9 | HARPER | 3 | 2 | 0 | 2 | 1 | 1 | 1 | 1 | 2 | 31 |
| 7 | KUKOC | 30 | 6 | 1 | 5 | 0 | 2 | 1 | 1 | 2 | 43 |
| 13 | LONGLEY | 6 | 7 | 5 | 2 | 1 | 3 | 2 | 0 | 4 | 23 |
| 25 | KERR | 6 | 0 | 0 | 0 | 2 | 0 | 0 | 0 | 1 | 18 |
| 91 | RODMAN | 2 | 3 | 0 | 3 | 0 | 0 | 0 | 1 | 5 | 24 |
| 24 | BURRELL | 0 | 0 | 0 | 0 | 0 | 2 | 0 | 2 | 1 | 10 |
| 1 | BROWN | 0 | 0 | 0 | 0 | 0 | 0 | 0 | 0 | 0 | 0 |
| HOME | | 81 | 33 | 13 | 20 | 19 | 16 | 5 | 11 | 25 | |
| VISITOR | | 83 | 37 | 11 | 26 | 24 | 16 | 3 | 10 | 24 | |

H · · · · · < V · · · · ·    GAME    P4  00:00

56        55

Figure 5: Game Shot Screen

| NO | NAME | M | A | FG% | 3M | 3A | 3P% | FM | FA | FT% |
|---|---|---|---|---|---|---|---|---|---|---|
| 23 | JORDAN | 9 | 26 | 35 | 0 | 2 | 0 | 10 | 11 | 91 |
| 33 | PIPPEN | 2 | 16 | 13 | 0 | 7 | 0 | 2 | 2 | 100 |
| 9 | HARPER | 1 | 6 | 17 | 1 | 1 | 100 | 0 | 0 | - |
| 7 | KUKOC | 11 | 13 | 85 | 4 | 6 | 67 | 4 | 7 | 57 |
| 13 | LONGLEY | 3 | 8 | 38 | 0 | 0 | - | 0 | 0 | - |
| 25 | KERR | 2 | 4 | 50 | 2 | 3 | 67 | 0 | 0 | - |
| 91 | RODMAN | 1 | 1 | 100 | 0 | 0 | - | 0 | 0 | - |
| 24 | BURRELL | 0 | 1 | 0 | 0 | 1 | 0 | 0 | 0 | 0 |
| 1 | BROWN | 0 | 0 | - | 0 | 0 | - | 0 | 0 | - |
| HOME | | 29 | 75 | 39 | 7 | 20 | 35 | 16 | 20 | 80 |
| VISITOR | | 34 | 67 | 51 | 1 | 5 | 20 | 14 | 18 | 78 |

H · · · · · < V · · · · ·    SHOT    P4  00:00

Figure 6: Game Period Screen

| | | 1P | 2P | 3P | 4P | OT | TOT |
|---|---|---|---|---|---|---|---|
| PT | HOME | 20 | 17 | 27 | 17 | - | 81 |
| | VISITOR | 22 | 19 | 25 | 17 | - | 83 |
| F% | HOME | 37 | 35 | 46 | 33 | - | 39 |
| | VISITOR | 51 | 45 | 55 | 42 | - | 51 |
| RB | HOME | 9 | 6 | 11 | 7 | - | 33 |
| | VISITOR | 12 | 9 | 7 | 9 | - | 37 |
| TO | HOME | 2 | 5 | 7 | 2 | - | 16 |
| | VISITOR | 3 | 5 | 7 | 1 | - | 16 |
| PF | HOME | 6 | 8 | 4 | 7 | - | 25 |
| | VISITOR | 3 | 9 | 10 | 2 | - | 24 |

Figure 7: Season Stats Screen

| NO | NAME | PT | RB | OR | DR | AS | TO | BS | ST | MP | GP |
|----|------|----|----|----|----|----|----|----|----|----|----|
| 23 | JORDAN | 29 | 6 | 2 | 4 | 4 | 2 | 1 | 2 | 39 | 82 |
| 33 | PIPPEN | 19 | 5 | 1 | 4 | 6 | 1 | 1 | 2 | 38 | 44 |
| 7 | KUKOC | 13 | 4 | 2 | 2 | 4 | 2 | 1 | 1 | 30 | 74 |
| 13 | LONGLEY | 11 | 6 | 2 | 4 | 3 | 1 | 1 | 1 | 30 | 58 |
| 9 | HARPER | 9 | 4 | 1 | 3 | 3 | 1 | 1 | 1 | 28 | 82 |
| 25 | KERR | 8 | 2 | 0 | 2 | 2 | 0 | 0 | 1 | 22 | 50 |
| 91 | RODMAN | 5 | 15 | 5 | 10 | 3 | 0 | 0 | 1 | 36 | 80 |
| 24 | BURRELL | 5 | 3 | 1 | 2 | 1 | 1 | 0 | 1 | 14 | 80 |
| 1 | BROWN | 4 | 1 | 1 | 0 | 2 | 2 | 0 | 1 | 16 | 71 |
| 34 | WENNING | 4 | 2 | 1 | 1 | 0 | 0 | 0 | 0 | 10 | 48 |
| 30 | BUECHLE | 3 | 1 | 0 | 1 | 1 | 1 | 0 | 0 | 8 | 74 |
| HOME | | 97 | 45 | 15 | 30 | 24 | 11 | 4 | 8 | - | 82 |
| VISITOR | | 90 | 40 | 12 | 27 | 20 | 14 | 4 | 8 | - | 82 |

Figure 8: Season Shot Screen

| NO | NAME | M | A | FG% | 3M | 3A | 3P% | FM | FA | FT% |
|----|------|---|---|-----|----|----|-----|----|----|-----|
| 23 | JORDAN | 11 | 23 | 47 | 0 | 2 | 24 | 7 | 9 | 78 |
| 33 | PIPPEN | 7 | 16 | 45 | 1 | 4 | 32 | 3 | 4 | 78 |
| 7 | KUKOC | 5 | 11 | 45 | 1 | 2 | 36 | 2 | 3 | 71 |
| 13 | LONGLEY | 5 | 11 | 45 | 0 | 0 | - | 2 | 3 | 74 |
| 9 | HARPER | 4 | 8 | 44 | 0 | 1 | 19 | 2 | 3 | 75 |
| 25 | KERR | 3 | 6 | 45 | 1 | 3 | 44 | 1 | 1 | 92 |
| 91 | RODMAN | 2 | 5 | 43 | 0 | 0 | 17 | 1 | 2 | 55 |
| 24 | BURRELL | 2 | 5 | 42 | 1 | 2 | 35 | 1 | 1 | 73 |
| 1 | BROWN | 2 | 4 | 38 | 0 | 0 | 0 | 1 | 1 | 72 |
| 34 | WENNING | 2 | 4 | 44 | 0 | 0 | - | 0 | 0 | 81 |
| 30 | BUECHLE | 1 | 2 | 48 | 0 | 1 | 39 | 0 | 0 | 50 |
| HOME | | 37 | 83 | 45 | 4 | 12 | 32 | 18 | 25 | 74 |
| VISITOR | | 34 | 79 | 43 | 4 | 12 | 32 | 17 | 24 | 73 |

Figure 9: Main Menu Screen

Figure 10: Menu Map

APPARATUS FOR RECORDING AND UTILIZING BASKETBALL GAME DATA

BACKGROUND OF THE INVENTION

1. Field of the Invention

This invention concerns apparatus for recording basketball game data during the game, instantly computing player and team derivative results useful in characterizing player and team performance, and transferring data to a personal computer for hardcopy reports or further analysis.

2. Description of the Prior Art

In many sporting activities, particularly competitive team sports, the progress and winning of the game is dependent upon a scoring system which generally involves the accumulation of points. The manner in which the points are scored, and the performance of the individual players are matters of interest to spectators and fans. Coaches and others concerned with maintaining and improving team and player performance are vitally concerned with such performance characteristics.

Various small portable electronic devices have been disclosed for enabling spectators to keep track of and tally game events. For example, U.S. Pat. No. 4,128,893 to Johnson, et. al. concerns a hand held battery operated device for recording won and lost points, and includes an electronic random access memory controlled by a keyboard, and a digital display. The memory contains individual storage locations corresponding to points earned and points lost for each play. Total points gained and lost are determined by displaying the contents of the counters. The Johnson, et. al. device, however, is restricted to a very specific functionality which is not applicable to the game of basketball, a game in which points are not lost.

U.S. Pat. No. 4,879,651 to Little concerns a miniature wrist-worn calculator that tracks points won and lost for the game of tennis. Two elongated multiple-digit displays indicate points won, points lost to the opponent, and the type of shots producing such points. As in the case of the aforesaid Johnson, et. al. Patent, the Little device is incapable of coping with basketball game factors.

U.S. Pat. No. 5,153,826 to Johnson relates to a hand-held portable device for keeping track of the in-play and error shots of a specific type of shot made by a player in a sports event such as tennis. The device comprises a first display for indicating the percentage of the cumulative number of in-play shots relative to the cumulative number of the total in-play and error shots. A first key switch is provided to input each in-play shot, and a second key switch is provided to input each error shot. A microprocessor keeps track of totals and computes various percentages. No menu driven software is provided to instruct the user in the operation of the device. There is only one mode of entering data, and no provision for saving data.

U.S. Pat. No. 5,377,982 to Villarreal concerns a portable electronic scorekeeper device which allows the user to record the nature of plays and scoring in a baseball game. Data is entered through a keyboard and is viewed in multiple displays. The device includes a microprocessor for compilation of data, a printer for hard copy reports, and an interface to a publicly displayed scoreboard.

U.S. Pat. No. 5,412,188 to Metz relates to a sports statistic recording system having charts containing bar codes, a scanning device, and a personal computer. The computer is programmed to associate specific bar codes with specific players and game events. The scanned information is conveyed to the computer for storage and compilation.

U.S. Pat. No. 5,527,033 to Puma, et. al. concerns a device for converting a box score in a hockey game to statistical data useful for coaches. The device includes a longitudinal carriage having an affixed timing chart, and a converting apparatus for deriving statistical data from the box score.

It is accordingly the primary object of the present invention to provide a hand held electronic device which enables the user to rapidly track performance information concerning players and teams during a basketball game.

It is another object of this invention to provide a device as in the foregoing object having a microcontroller and a menu-driven software system that steps the user through all functions and features in the device.

It is a further object of the present invention to provide a device of the aforesaid nature having an LCD window, and operable by battery power or AC current.

It is still another object of this invention to provide a device of the aforesaid nature which can enter different displays upon the LCD window.

It is yet another object of the present invention to provide a device of the aforesaid nature of compact design adapted to be held with two hands, and having thumb-operable keys closely adjacent said window.

It is a still further object of this invention to provide a device of the aforesaid nature having a non-volatile memory component which retains information after the power has been shut off.

It is an additional object of the present invention to provide a device of the aforesaid nature capable of transferring said retained information to a standard personal computer.

It is still another object of this invention to provide a device of the aforesaid nature of sufficiently rugged construction to survive being dropped onto a hard floor surface in the course of a basketball game.

It is a further object of the present invention to provide a device of the aforesaid nature having the capability of saving data concerning games and rosters, and computing season statistics.

None of the patents described above, taken singly or in combination, describe or suggest the instant invention.

These objects and other objects and advantages of the invention will be apparent from the following description.

SUMMARY OF THE INVENTION

The above and other beneficial objects and advantages are accomplished in accordance with the present invention by a hand held electronic device having an LCD window and thumb-operable keys adjacent said LCD for the rapid and enduring recordation of performance information concerning players and teams during a basketball game, and producing derivative statistical data, said device comprising:

a) first means for inputting player and team information including names and uniform numbers, said first means including a first plurality of keys, b) second means for inputting each play event as it occurs, said second means including a second plurality of keys, c) first storage means for storing control logic, said control logic defining a protocol for updating said performance statistics, said first storage means comprising at least read only memory, d) second storage means for storing information from said first input means, said second storage means comprising at least random access memory, e) third storage means for storing information from said second input means, said third storage means comprising at least random access memory, f) means for updating said performance statistics according to said play event input via said second inputting means and said protocol, and producing a first display of said statistics on said window, and g) a menu-driven software system that steps the user through all functions and features of the device.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
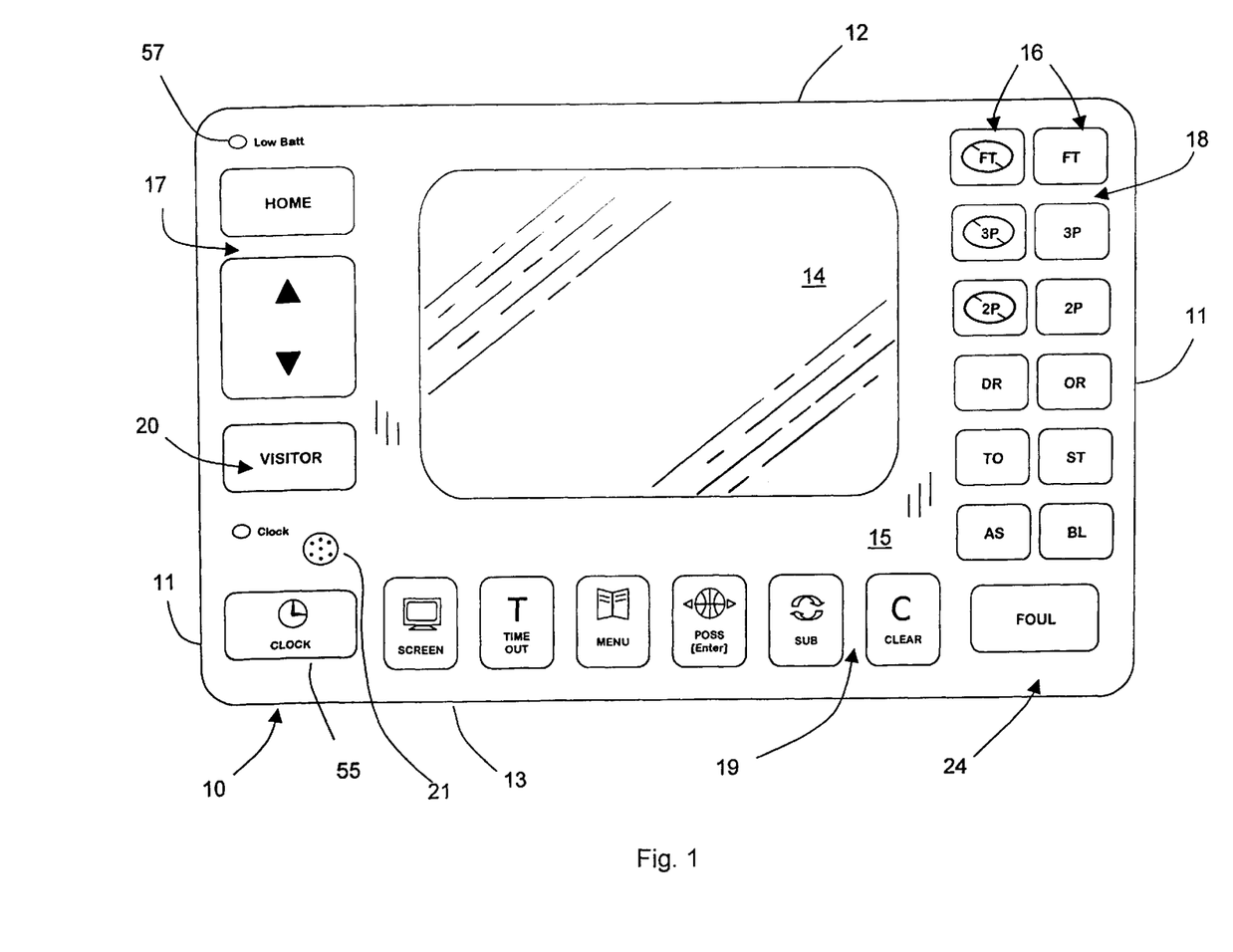
FIG. 1 is a top plan view of an embodiment of the device of the present invention.

Referring to FIG. 1, an embodiment of the device 10 of the present invention is shown comprised of a housing case 24 fabricated of impact-resistant polymer such as ABS (acrylonitrile/butadiene/styrene). The shown case has a rectangular perimeter defined by approximately parallel side edges 11 and approximately parallel upper and lower edges 12 and 13, respectively. The case, having rounded corners, may typically have a width, measured between said side edges, of between about 8 and 12 inches, and a length, measured between said upper and lower edges, between about 5 and 8 inches.

A flat LCD (liquid crystal display) 14 of rectangular contour is substantially centered within top surface 15 of case 10. A series of control touch keys 16 is surroundingly disposed about LCD 14, said keys being arranged in a left vertical group 17, right vertical group 18, and bottom horizontal group 19. In the exemplified embodiment, the keys of group 17 are utilized to select players and/or teams, the keys of group 18 record "actions" or game events such as field goals, rebounds, and turnovers, and the keys of group 19 support additional operational features to include both recording statistics and data manipulation. Said series of control touch keys are fabricated of a rubber silicone base and polycarbonate key tops. Indicia 20 describing the function of each key may be disposed on each key or on surface 15 adjacent the keys. Speaker 21 permits audio feedback to the user. LCD 14 employs a display capability of at least 230×120 pixels, and is capable of presenting data in multiple formats.

Figure 2:
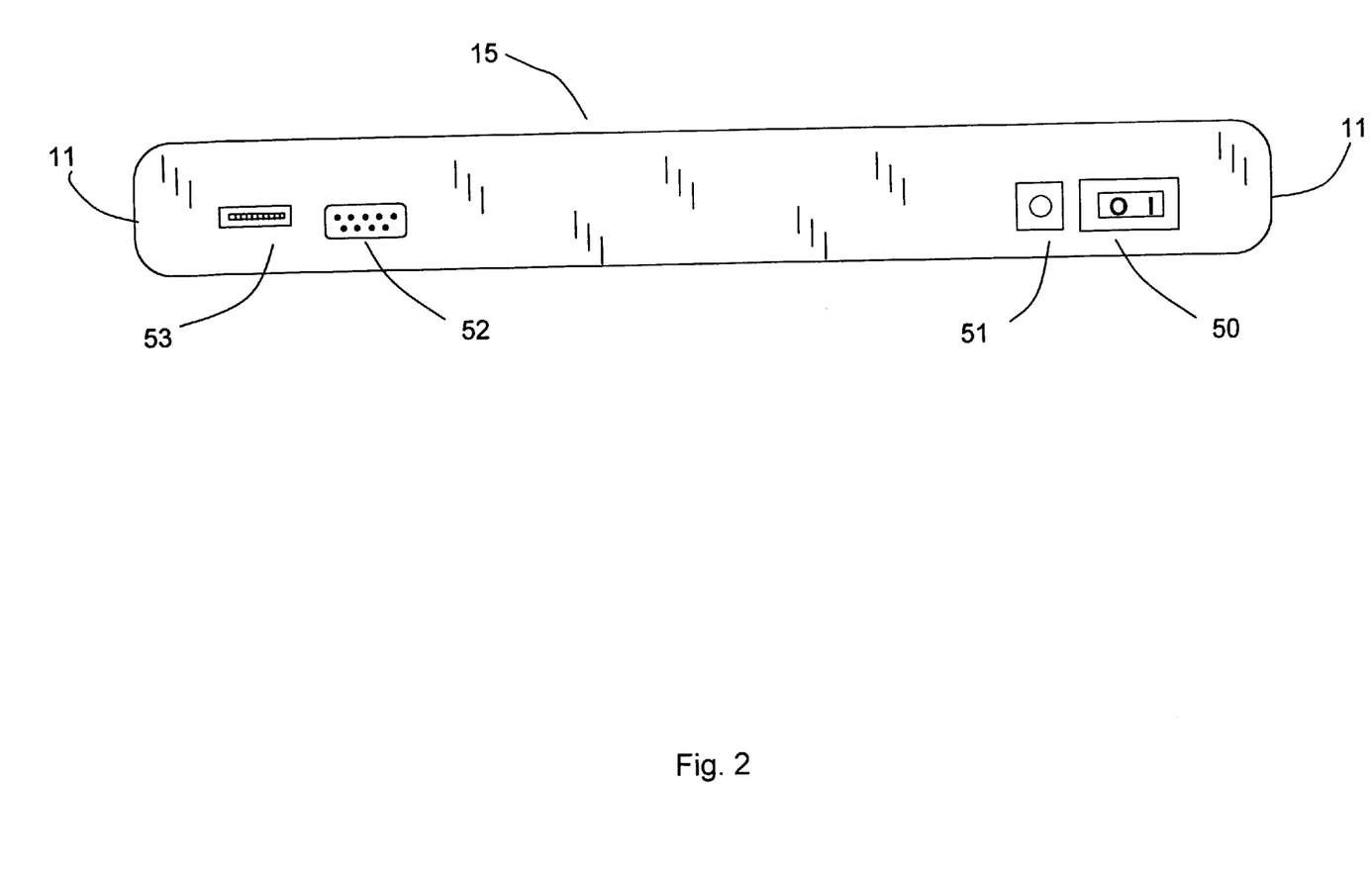
FIG. 2 is a rear view of the embodiment of FIG. 1.

The upper or rear edge 12 of the device of FIG. 1, as shown in FIG. 2, is equipped with a power switch 50, an AC power jack 51, a RS-232 serial port 52, and an LCD contrast dial 53. Power switch 50 turns power on and off and is comprised of a simple rocker switch. AC power jack 51, when used in combination with a matching power cable (not shown), is utilized to draw current from any standard U.S. wall outlet. When said power jack is connected to such wall outlet, battery life is preserved for future use. RS-232 serial port 52, when used in combination with any straight-through 9-pin serial cable, is utilized to transfer data between the device and a personal computer to include IBM-compatible or Macintosh formats. LCD contrast dial 53 adjusts the contrast of the aforementioned LCD 14.

Figure 3:
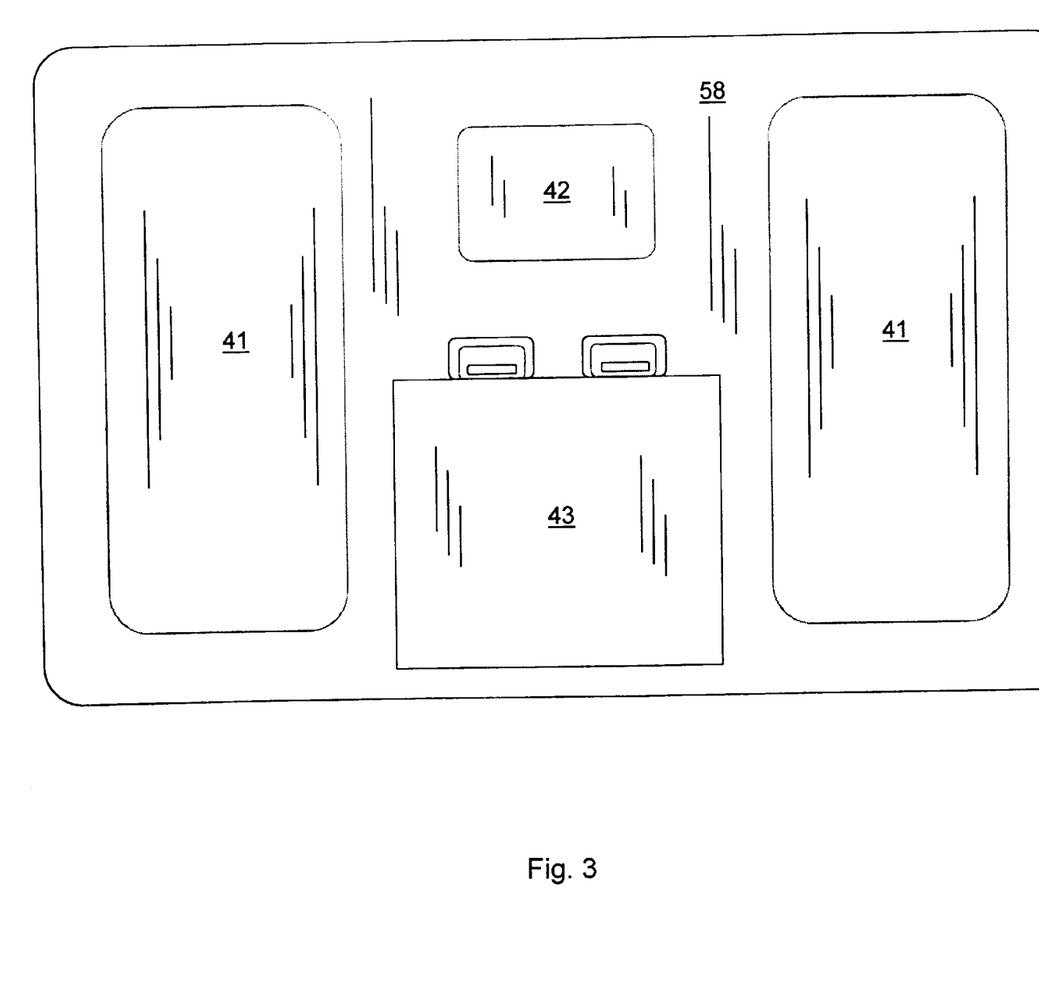
FIG. 3 is a bottom plan view of the embodiment of FIG. 1.

The bottom surface 58 of the device of FIG. 1, as shown in FIG. 3, contains paired finger recess holds 41, label recess 42, and battery compartment access 43. Finger recess holds 41 are slight depressions in the housing which provide comfort and grip during operation. Said holds 41 are elongated between said upper and lower edges and have a horizontal dimension measuring between about 2 and 4 inches, and a depth measuring between about 0.1 and 0.5 inches. The device of this invention is designed to be held with two hands, with fingers wrapped around the bottom of the device and thumbs used to press said keys 16. Such design allows a user to very quickly record events for players and teams during the non-stop action of a basketball game.

Label recess 42 is designed to accommodate 30 mm×50 mm. labels, and provides an area for product identification information which may include product name, company name, Federal Communication Commission approval, and serial number. Battery compartment 43 is equipped with an access lid.

A person skilled in the art should understand that the specific external features of the device, as depicted in FIGS. 1, 2 and 3 may be rearranged to arrive at a different configuration without detracting from the essence of the present invention.

Figure 4:
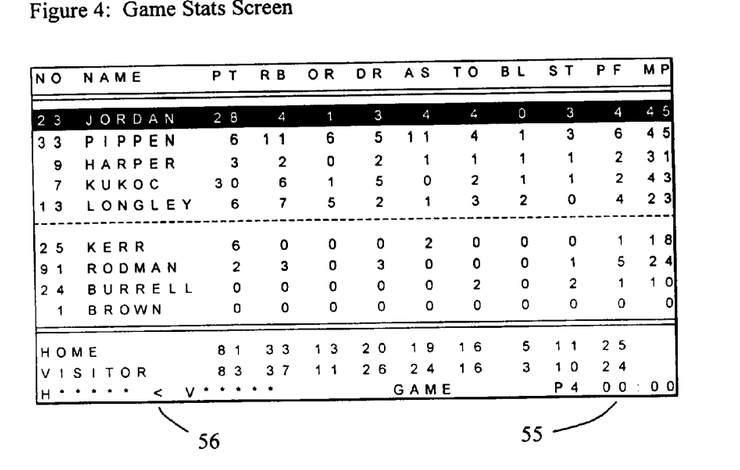
FIGS. 4–8 are sample data screens displayed by the device of this invention.
Figure 5:
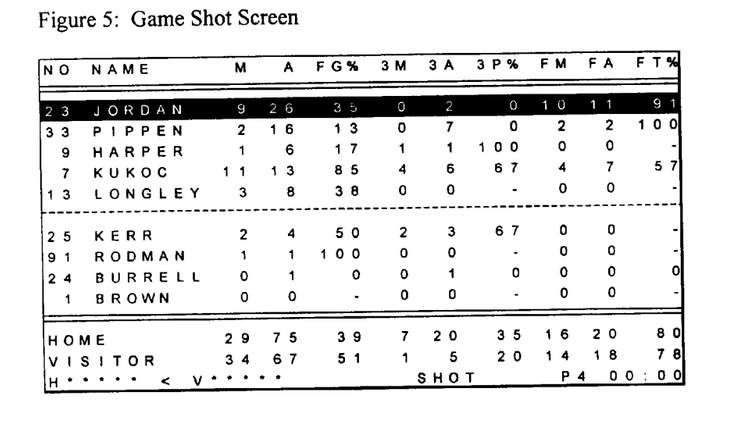
Figure 6:
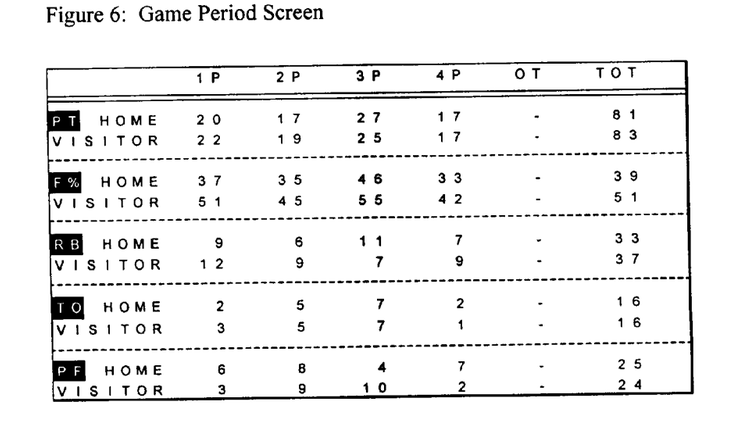

FIGS. 4, 5 and 6, show three primary screens displayed by LCD 14 when information is recorded or produced by the device 10 of this invention. Referring to FIG. 4, which is named the Game Stats Screen, information is organized in table format. Categories are shown in a top row which defines vertical columns. Reading across said top row, we see in sequential order: player uniform number ("NO"); player name ("NAME"); points ("PT"); total rebounds ("RB"); offensive rebounds ("OR"); defensive rebounds ("DR"); assists ("AS"); turnovers ("TO"); blocked shots ("BL"); steals ("ST"); personal fouls ("PF"); and minutes played ("MP"). Each player for the "home team" has a row in the Game Stats Screen. Only team totals are recorded for the opposing or "visitor" team. At the bottom of the screen are shown cumulative statistics for each of the two teams, which are updated in real-time. A game clock 55 may also be provided, and produces a running readout on the screen, as shown at the lower right hand corner of FIG. 4. Time outs, and a possession arrow 56 may also be indicated at the bottom of the screen.

FIG. 5, the Game Shot Screen, follows the tabular format used in the Game Stats Screen of FIG. 4. However, category columns are changed to: player uniform number ("NO"); player name ("NAME"); made field goals ("M"); attempted field goals ("A"); field goal percentage ("FG %"); made three-point field goals ("3M"); attempted three-point field goals ("3A"); three-point field goal percentage ("3P %");

made free throws ("FM"); attempted free throws ("FA"); and free throw percentage ("FT %"). All percentage fields are automatically computed from user input of other fields. Like the Game Stats Screen in FIG. 4, cumulative statistics are shown at the bottom of the Game Shot Screen and are updated in real-time. Game clock, time outs, and possession arrow are also shown.

Actions or statistics are recorded during a game by moving the cursor on the LCD to a player row using the arrow keys in the left vertical group 17, and pressing the applicable action key in vertical group 18. Actions may be recorded while viewing either the Game Stats Screen or Game Shot Screen. Actions are recorded for the visiting team by pressing the "Visitor Key" in vertical group 17 to move said cursor down the visitor team line in FIGS. 4 or 5. All applicable derived or computed statistics are updated for every event. The horizontal doted line in FIGS. 4 and 5 distinguishes between players in the game and players not in the game. The five players above the dotted line are considered in the game. A substitution mechanism is utilized to move players into and out of the game and thus move player rows on the display above and below the said dotted line. Said substitution mechanism includes a capability to compute and display the minutes played for each player on the "home team." The area in the display between the dotted line and team totals in the Game Stats Screen "scrolls" to view all players not in the game, said scrolling involving the continuous sequential display of lines of information.

FIG. 6 shows the Game Period Screen, which displays additional recorded and derived information. For each event recorded, device 10 allocates the event to a period based on current clock condition. Current totals are displayed in the Game Period Screen. Data provided in the Game Period Screen includes points ("PT"); field goal percentage ("F %"); rebound ("RB"); turnovers ("TO"); and personal fouls ("PF") by period of the game ("1P", "2P", "3P", "4P", OR "OT"). Screens are selected by user using control touch keys in horizontal group 19.

The device of the present invention provides a second mode to record and track statistics for teams only. When recording statistics for teams only, the Game Stats and Game Shot Screens are adjusted to show team totals only.

Figure 7:
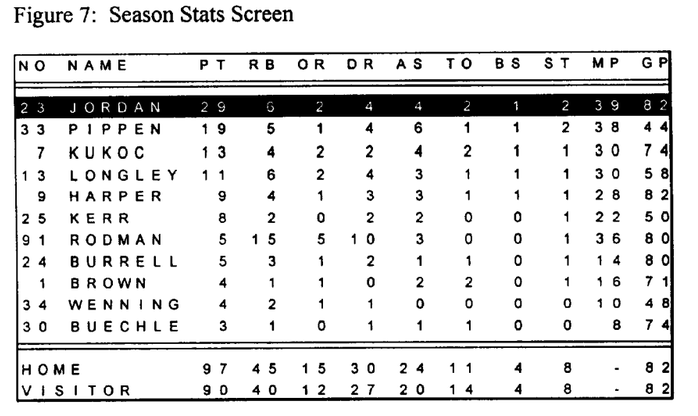
Figure 8:
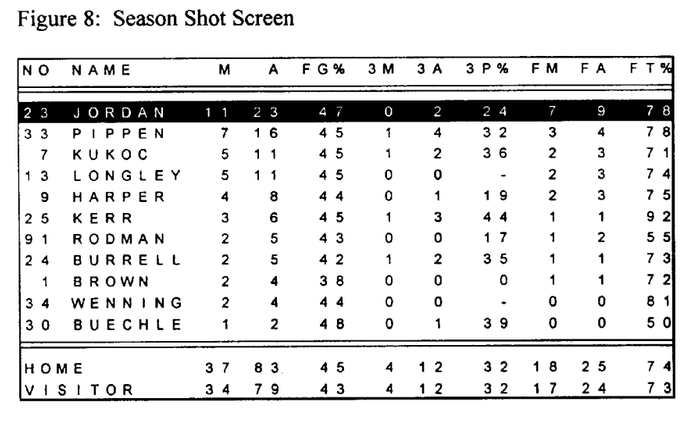

The device of the present invention includes the capability to compute and edit cumulative season statistics for players and teams. Season statistics are automatically computed and updated when the user applies game data to the current season data. All totals, averages, and percentages are updated, saving the user hours of subsequent work with a calculator or computer. FIGS. 7 and 8 show screens used to display season statistics. The season statistic screens follow the format of the Game Stats Screen and Game Shot Screen in FIGS. 4 and 5, respectively. As mentioned hereinabove, all data, including game and season statistics, can be downloaded to a personal computer by way of serial port 52. The downloaded information is received by software which facilitates the saving, printing or manipulation of the information.

Figure 9:
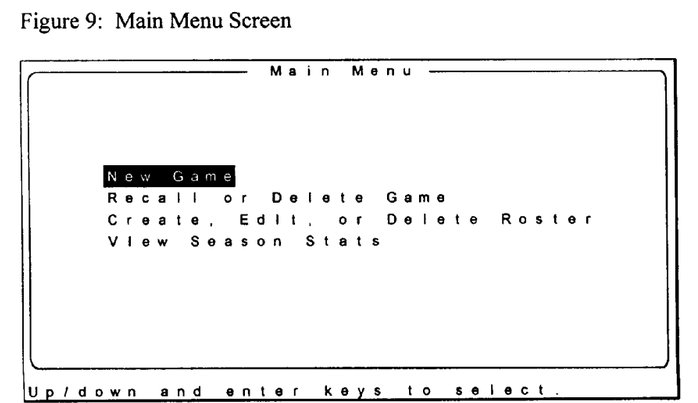
FIG. 9 is a sample menu screen displayed by the device of this invention.

FIG. 9 is a sample menu screen; one of the many menu screens provided by the software of the device of this invention. The title of the menu is located in the top center of the screen, and uniquely identifies the screen. Menu options are listed in the center, with the cursor producing a highlighting of the uppermost listed option. Along the bottom row of the display, context sensitive instructions are given to remind the user of necessary user input. Thus, the menu-driven system instructs the user with respect to all functions and features, thereby facilitating use of the device.

In the menu-driven software system, the user selects options from a list displayed on the LCD. Each option is a clear, succinct description of a particular feature or function of the device. An option is selected by moving the cursor to the desired option using the control touch keys of vertical group 17, and pressing an enter key in horizontal group 19. Once an option is selected, the screen displays the next menu, or applicable data. Options shown in the Main Menu screen depicted in FIG. 9 include: New Game; Recall or Delete Game; Create, Edit or Delete Roster; and View Season Stats.

Figure 10:
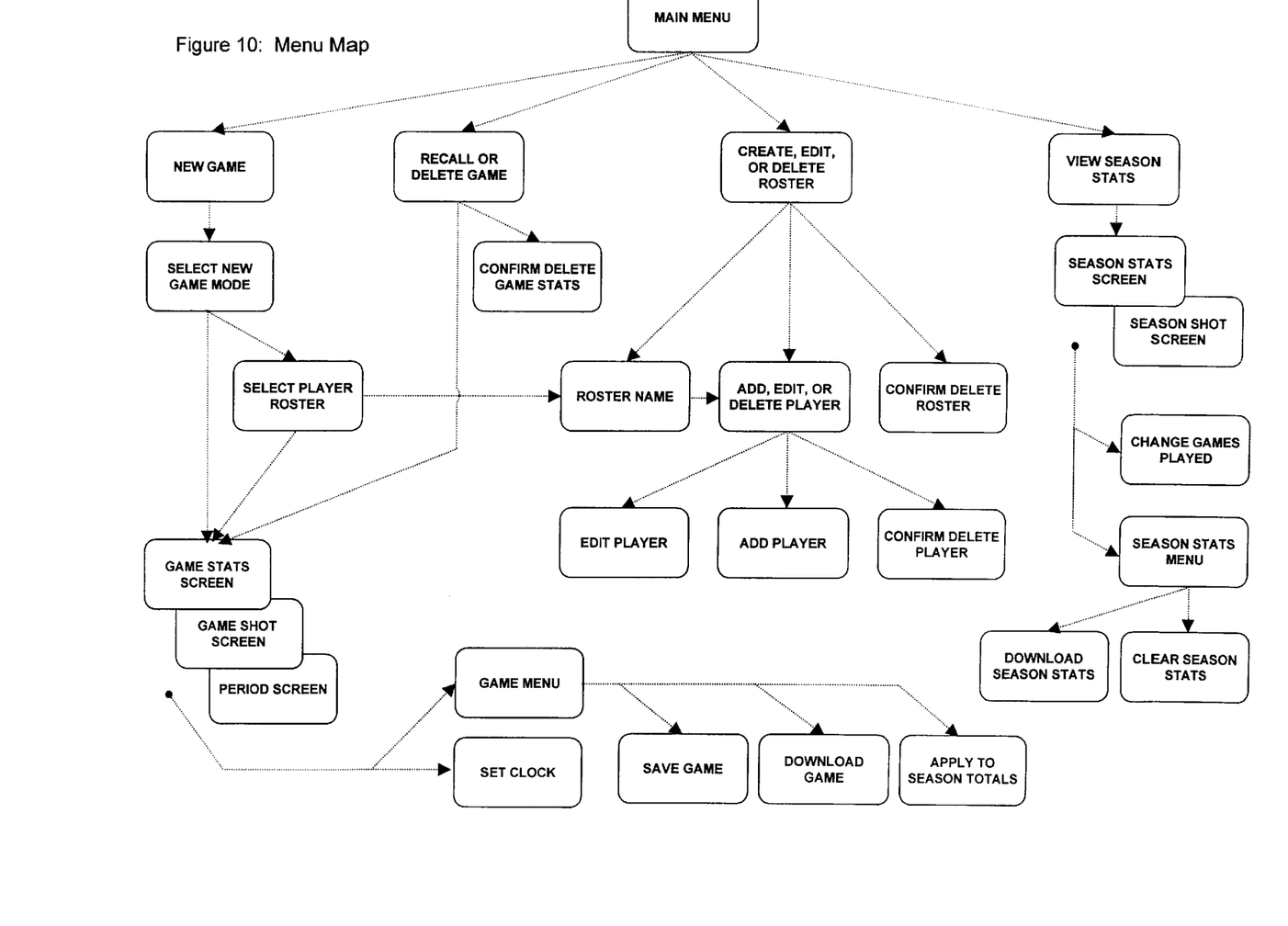
FIG. 10 is the hierarchy of means employed to step the user through the features and functions for the device of this invention.

FIG. 10 shows the "menu map," or screen hierarchy, for the software of the device of this invention. The arrows in FIG. 10 represent "paths" available to the user to reach all the available screens of the device. There are four primary paths in the software of the device of this invention. The first path is the new game path. Selecting "New Game" from the main menu steps the user through the steps of setting up a new game. These steps include selecting the game mode and a team roster. The second path is recalling or deleting a saved game. The device may save up to 24 games in memory and which may be recalled at any time for updates or reference. After selecting "Recall or Delete Game" from the Main Menu, the user is presented with a list of games to recall or delete. The third path is creating, editing, or deleting players or rosters. By selecting the "Create, Edit or Delete Roster" option from the Main Menu, the user is provided the capability to edit any of 4 rosters saved in memory (with a maximum of 15 players), or create a new roster. Editing includes deleting a roster, adding a player to a roster, editing a player on a roster, or deleting a player from a roster. The fourth and final path is viewing an editing season statistics. By selecting "View Season Stats" from the Main Menu, the user is directed through the process of viewing and editing season data for any saved roster.

A person skilled in the art should understand that the specific menu-driven features of the device, as depicted in FIG. 10 may be rearranged to arrive at a different configuration without detracting from the essence of the present invention.

Figure 11:
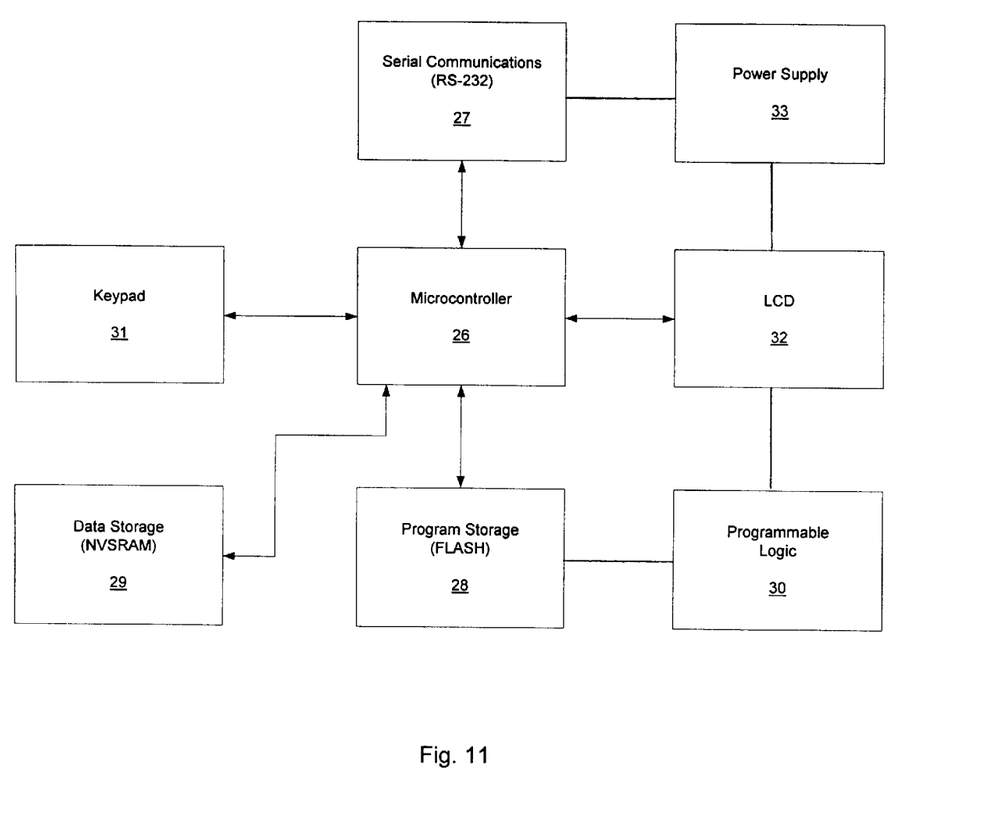
FIG. 11 is a block diagram showing the interrelationship of the various elements of the present invention.
Figure 12:
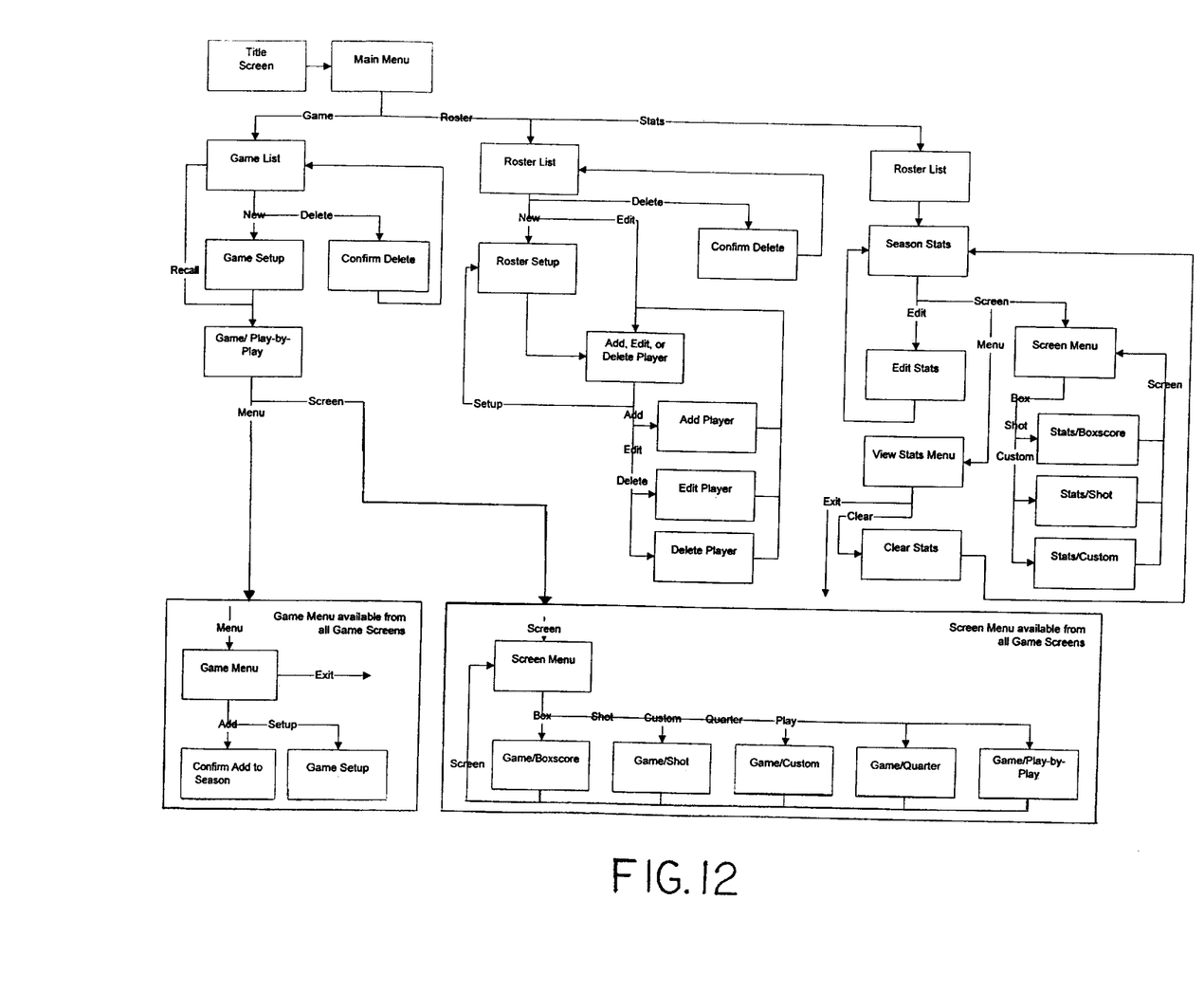
FIG. 12 is a flow chart showing an example of an algorithm that would be used in the device of this invention.

FIG. 11 is a block diagram showing the interrelationship of the various elements of the device of this invention. A microcontroller, represented by block 26, is responsible for recognizing when keys are pressed, acting upon valid presses, performing statistical manipulations, updating the LCD and storing the data in the proper location of Data Storage 29. In addition, the Microcontroller acts as the interface between the Serial Communications and Program Storage components 27 and 28, respectively, while "flashing" new program code into the unit from a personal computer. Another task of the Microcontroller is to provide user feedback by the potential control of LED's (light emitting diodes) and a buzzer effect associated with speaker 21. Lastly, the Microcontroller acts as the interface between the Serial Communications component 27 and Data Storage component 29 when downloading statistical information to a personal computer.

Serial Communications component 27 converts TTL level signals being transmitted from said Microcontroller to RS-232 standard levels for the personal computer and vice-versa. The purpose of this is to allow the device to be connected to a standard personal computer serial communications port and to make the data transmission path less susceptible to interference. The Serial Communications component is exercised when downloading program code into the device and when transferring statistics to a personal computer.

Data Storage, represented by block 29, is the memory area where all players, rosters, teams, and statistics are stored. It is a non-volatile memory component (NVSRAM) so that the information is retained after the power has been shut off. The device may store 4 rosters (15 players per roster) and 24 games in memory. These rosters and games may be recalled at any time for subsequent updates or modifications.

Program Storage component 28, is the memory area where the application code for the Microcontroller resides. It is a FLASH type device so software updates can easily be downloaded via the serial communications component. A software protection scheme is preferably implemented to protect from inadvertently writing over the application software.

Programmable Logic, represented by block 30 is a programmable logic device (PLD) that replaces traditional logic gates. The advantages of the PLD are its flexibility to change logical states via software and the smaller amount of circuit board space required to implement the logic. The PLD is used as a controlling mechanism that acts upon inputs such as address lines from the Microcontroller and generates control outputs. It controls the access to Data Storage, Program Storage, and the LCD. It also dictates when the unit can be "flashed" and signals the Microcontroller when a key is pressed.

A keypad component, represented by block 31, is a matrix of rows and columns of circuit board contacts that are used to indicate which key is pressed. When the Programmable Logic block recognizes a key press, it interrupts the Microcontroller. The Microcontroller determines which key has been pressed, whether the press is valid, and interprets the input.

The LCD, represented by block 32, provides the graphical interface between the electronics and the user. It consists of an LCD graphics module with an onboard driver. As the user presses keys, the Microcontroller updates the screen accordingly. Contrast control is provided to the user for easy viewing.

A power supply, represented by block 33, converts DC power from either an AC/DC adaptor or the batteries to a system wide +5 VDC. Additionally, the Power Supply block generates the necessary negative voltage required by the LCD. The power supply also provides feedback to the onboard analog-to-digital converter of the Microcontroller for monitoring battery voltage and interacts with diode indicator light 57 on upper surface 15. As a backup to the Microcontroller monitoring scheme, the power supply component will put the Microcontroller in a constant reset state to avoid a hard shutdown of the controller.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described our invention, what is claimed is:

1. A hand held portable electronic device having an LCD window and thumb-operable keys adjacent said window for the rapid and enduring recordation of performance information concerning players, play events and teams during a basketball game, and producing derivative statistical data, said device comprising:

a) first means for inputting player and team information including names and uniform numbers, said first means including a first plurality of keys, b) second means for inputting each play event as it occurs, said second means including a second plurality of keys, c) first storage means for storing control logic defining a protocol for updating said performance information and statistical data, and comprising at least read only memory, d) second storage means for storing information from said first input means, and comprising at least random access memory, e) third storage means for storing information from said second input means, and comprising at least random access memory, f) means for updating said performance information and statistical data according to said play events via said second inputting means and said protocol, and producing a first display thereof on said window, and g) a menu-driven software system that steps the user through all functions and features of the device.

2. The device of claim 1 wherein the device is powered by either of battery power or AC current.

3. The device of claim 2 wherein said storage means have non-volatile memory which retains information after said power has been shut off.

4. The device of claim 3 further comprising an impact-resistant housing case of substantially rectangular contour having top and bottom surfaces, upper, lower and side edges and rounded corners.

5. The device of claim 4 wherein said LCD window and keys are located in said top surface.

6. The device of claim 5 wherein said bottom surface contains paired recesses which facilitate the holding of the device with two hands with fingers wrapped around said side edges and thumbs used to press said keys.

7. The device of claim 1 further provided with means for downloading said information and data to a personal computer.

8. The device of claim 1 further provided with means for accumulating and compiling data to produce season statistical data.

9. The device of claim 1 further provided with timing means interactive with said LCD.

10. The device of claim 1 wherein said LCD displays a game statistics screen which presents a tabulation of game play events per player.

11. The device of claim 10 wherein said LCD displays a game shot screen which presents a tabulation of points scored per player.

12. The device of claim 11 wherein said LCD displays a game period screen which presents a tabulation of team points and play events per game period and per home and visitor teams.

13. The device of claim 10 wherein said LCD displays a season statistics screen which presents the season totals of game play events per player.

14. The device of claim 11 wherein said LCD displays a season shot screen which presents the season total of points scored per player.

15. The device of claim 1 further comprising audible signal means.

* * * * *